United States Patent [19]
Hayashi et al.

[11] Patent Number: 5,967,014
[45] Date of Patent: Oct. 19, 1999

[54] WORK CUTTING APPARATUS

[75] Inventors: Takao Hayashi, Gifu; Nobuo Sahashi, Inuyama, both of Japan

[73] Assignee: Murata Kikai Kabushiki Kaisha, Kyoto, Japan

[21] Appl. No.: 08/897,691

[22] Filed: Jul. 21, 1997

[30] Foreign Application Priority Data

Jul. 24, 1996 [JP] Japan ................................. 8-214267

[51] Int. Cl.$^6$ ................................................. B23D 17/02
[52] U.S. Cl. ........................... 83/605; 83/601; 83/699.51
[58] Field of Search ........................... 83/601, 605, 608, 83/699.51, 699.11, 917, DIG. 2

[56] References Cited

U.S. PATENT DOCUMENTS

| | | | |
|---|---|---|---|
| 173,732 | 2/1876 | Matthews | 83/605 |
| 429,809 | 6/1890 | Heinzelman et al. | 83/605 |
| 434,956 | 8/1890 | Scofield | 83/605 |
| 562,513 | 6/1896 | Dick | 83/608 |
| 1,979,199 | 10/1934 | Haynes | 83/608 |
| 2,102,170 | 12/1937 | Stern | 83/917 |
| 2,208,966 | 7/1940 | Eickman | 83/917 |

*Primary Examiner*—Rinaldi I. Rada
*Assistant Examiner*—Gyounghyun Bae
*Attorney, Agent, or Firm*—Armstrong, Westerman, Hattori, McLeland and Naughton

[57] ABSTRACT

A work cutting apparatus in which clearance adjustment is simultaneously possible for the two sides of the L-shape of the blade by a single adjustment operation and in which the elevation system of the movable blade has a simple arrangement. The work cutting apparatus is provided with a fixed blade of which the plan shape is approximately L-shaped, and a movable blade that moves vertically and comprises an approximate l-shape in alignment with the fixed blade. The movable blade is mounted on the tip of a ram that pivots vertically via a pivot support shaft arranged on the lower frame. The pivot support shaft is an eccentric shaft and, by adjusting the rotation of the angle of the shaft, the oscillation center of the ram is changed and the clearance adjustment of the blades is possible. The axial direction of the pivot support shaft is angled with respect to both sides forming the L-shape of the fixed blade and by adjusting only the rotation angle of the pivot support shaft, clearance adjustment of both sides forming the L-shape of the blades may be simultaneously performed.

3 Claims, 9 Drawing Sheets

WORK CUTTING APPARATUS

FIELD OF THE INVENTION

The present invention relates to a work cutting apparatus called a right angle shear, or the like, for cutting work of sheet metal by an L-shaped blade.

BACKGROUND OF THE INVENTION

A device whereby a movable blade is vertically moved has been proposed as this type of conventional work cutting apparatus. Apart from this, a device has been used whereby an L-shaped blade is vertically moved about a pivot support shaft parallel to one side.

However, in either devices, the adjustment of one side of the blade and the other side of the blade must be performed independently in order to adjust the clearance between the fixed blade and movable blade corresponding to the thickness of the work, and thus the adjustment operation is time consuming.

Moreover, two types of adjustment systems, are necessary and the structure becomes complicated.

Furthermore, the elevation guide and elevation drive systems of the device, which vertically move the movable blade, become complicated and increase the cost.

SUMMARY OF THE INVENTION

In order to solve the aforementioned problems, it is an object of the present invention to propose a work cutting apparatus in which the adjustment operations are simple and may be performed by a single operation without the need of a complicated system for clearance adjustment of the movable blade.

It is a further object of the present invention to propose a work cutting apparatus in which the elevation system of the movable blade is a simple structure in which simple clearance adjustment is possible.

The work cutting apparatus of the present invention is a device provided with a fixed blade, of which the plan shape is approximately L-shaped, and a movable blade, which moves vertically and has an approximately L-shape aligned with that of the fixed blade. The apparatus cuts work by the engagement of the fixed blade and movable blade, arranged with a movable blade adjustment means having a structure as described below. In short, the movable blade adjustment means adjusts the position in the horizontal direction of the movable blade with respect to the fixed blade and simultaneously adjusts both sides which form the L-shape of the movable blade by a single adjustment operation.

Due to this arrangement, the clearance of both sides of the movable blade may be adjusted with respect to the fixed blade by a single adjustment operation and the step changing operation associated with a change in the thickness of the work may be completed in reduced time.

Furthermore, the inclusion of independent adjustment means for each side for the adjustment of the movable blade is unnecessary and the structure is simplified.

On the aforementioned work cutting apparatus, the movable blade is mounted on the tip of a ram that pivots vertically via a rotating support shaft arranged on the frame and the axial direction of the rotating support shaft may be inclined with respect to both the sides of the L-shape of the movable blade. In this kind of arrangement, as the movable blade is elevated due to the vertical movement of the ram, a complicated guide system for the elevation of the movable blade is unnecessary and the elevation system is simplified. In this case, as the rotating support shaft is inclined with respect to both sides, the clearance of both sides of the movable blade forming an L-shape may be adjusted by a single operation.

In this arrangement, the rotating support shaft may be mounted eccentrically with respect to the pivot shaft on the frame. Due to the arrangement of the rotating support shaft as an eccentric shaft, by simply rotating the rotation shaft, the clearance adjustment of both sides of the movable blade is performed due to the movement of the pivot center of the ram due to the eccentricity of the rotating support shaft, the structure is simplified and the adjustment operation is simplified.

DETAILED DESCRIPTION OF THE PREFERRED EMBODIMENTS

Hereafter, an embodiment of the present invention will be described using FIGS. 1 through 9.

Figure 5:
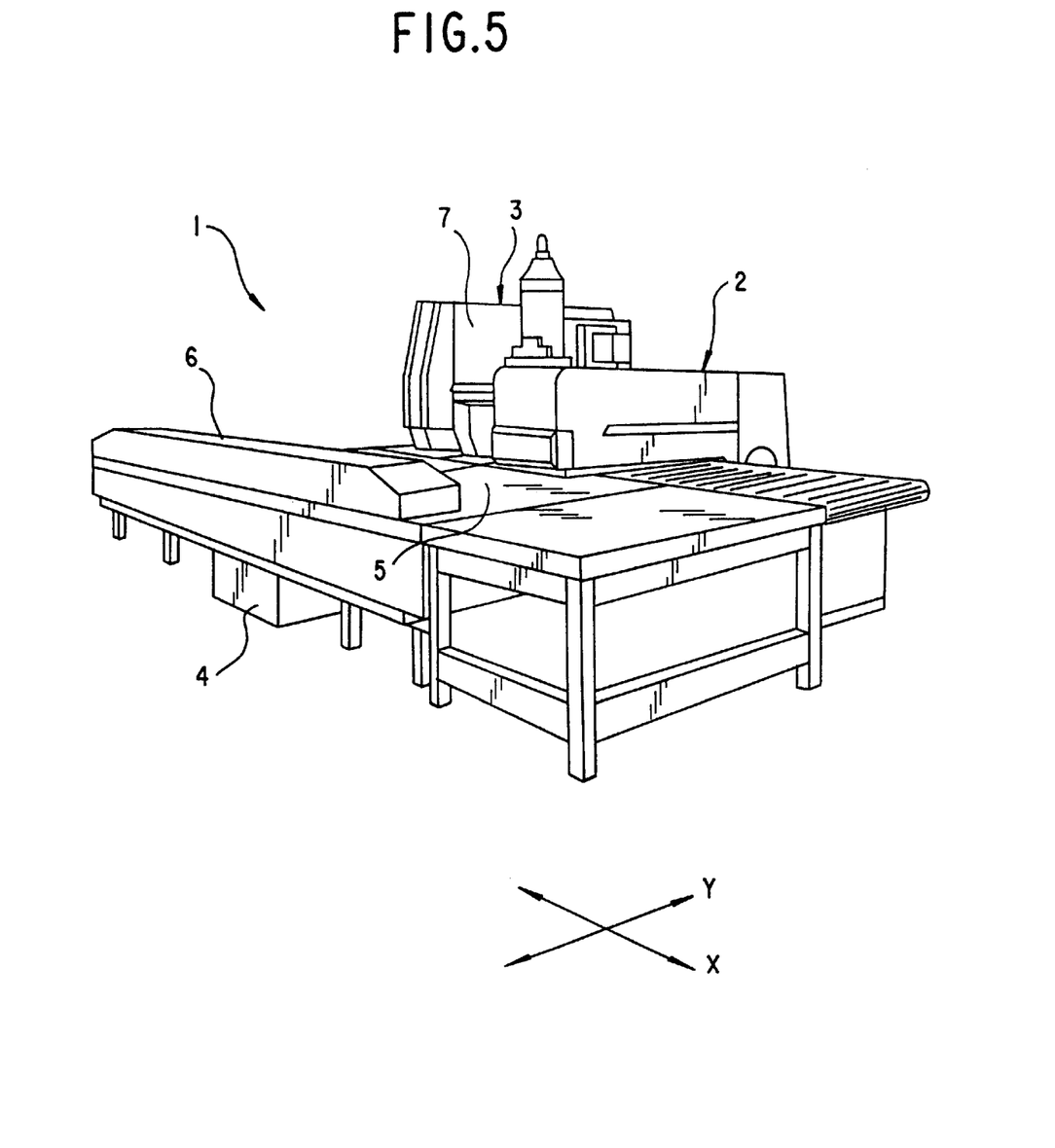
FIG. 5 is a perspective view of a work processing apparatus incorporating the work cutting apparatus shown in FIG. 1, together with work delivery equipment, a punch frame and work table.
Figure 6:
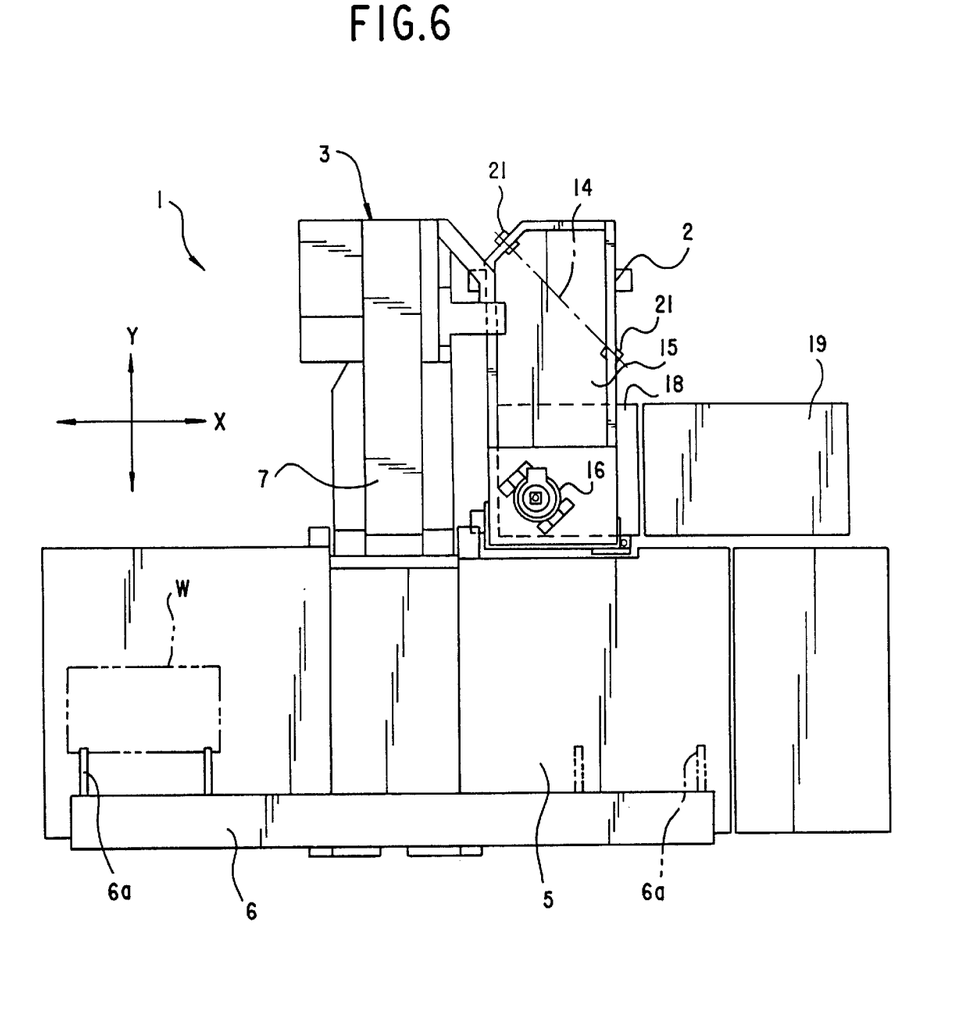
FIG. 6 is plan view of the work processing apparatus shown in FIG. 5.

FIGS. 5 and 6 show respectively a perspective view and plan view of a work processing apparatus utilizing the work cutting apparatus that is one embodiment of the present invention.

A work processing apparatus 1 is provided with a turret type punch press device 3 adjacent to a work cutting apparatus 2 and comprises a compound device in which both the work cutting apparatus and the punch press make use of a work table 5 and work delivery device 6. The work delivery device 6 grips a work W on the work table 5 by a work holder 6a, moves it in the left-right direction (X-axis direction) and forward-backward direction (Y-axis direction) and thus while gripping the work W, permits delivery in each direction covering both the cutting processing part of the work cutting apparatus 2 and the punch processing part of the punch press device 3.

A C-shaped punch frame 7 of the punch press device 3 is arranged to the rear of a bed 4 and an upper turret provided with a plurality of punch tools in series (not shown in the drawings), a lower turret (not shown in the drawings) arranged with a plurality of dies corresponding to the punch tools in series, and a punch drive system (not shown in the drawings) that vertically drives the punch tool in a predetermined punch position are arranged on the frame 7.

The work cutting apparatus 2 cuts the work W, which has had holes opened in it by the punch press device 3 and which is delivered by the work delivery device 6 and as shown in the plan view, front view, right side view and left side view of FIGS. 1, 2, 3, and 4, has a movable blade 12 and fixed blade 13 positioned vertically opposite each other on a frame 11 that is the work cutting apparatus main body. The frame 11 has a vertical rectangular box shape with a cut away shaped open part 11a extending from the front surface to the middle of both sides and, due to this, the side of the frame has a C-shape.

Figure 1:
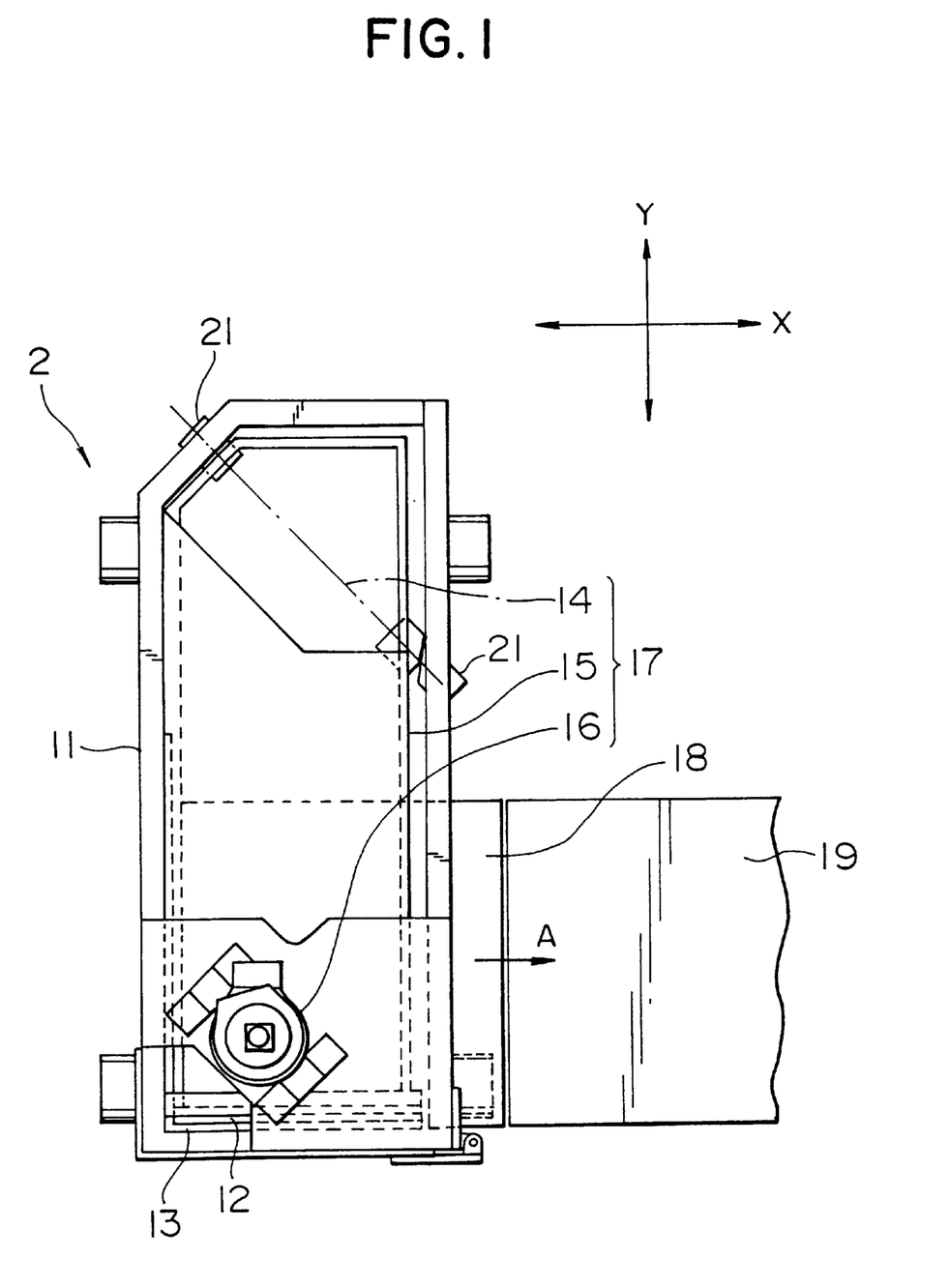
FIG. 1 is a partial plan view of the work cutting apparatus being one embodiment of the present invention.

The fixed blade 13 has a profile shape that extends in an L-shape from the left-right direction (X-axis direction) to the front-back direction (Y-axis direction) and is positioned along the inside lower edge of the cut away open part 11a of the frame 11. The movable blade 12 has a profile L-shape following the inside of the fixed blade 13, and the blade tip is provided with one type of slant (rake angle) from one end to the other end via the intersection of the parts of the L-shaped blade.

Figure 2:
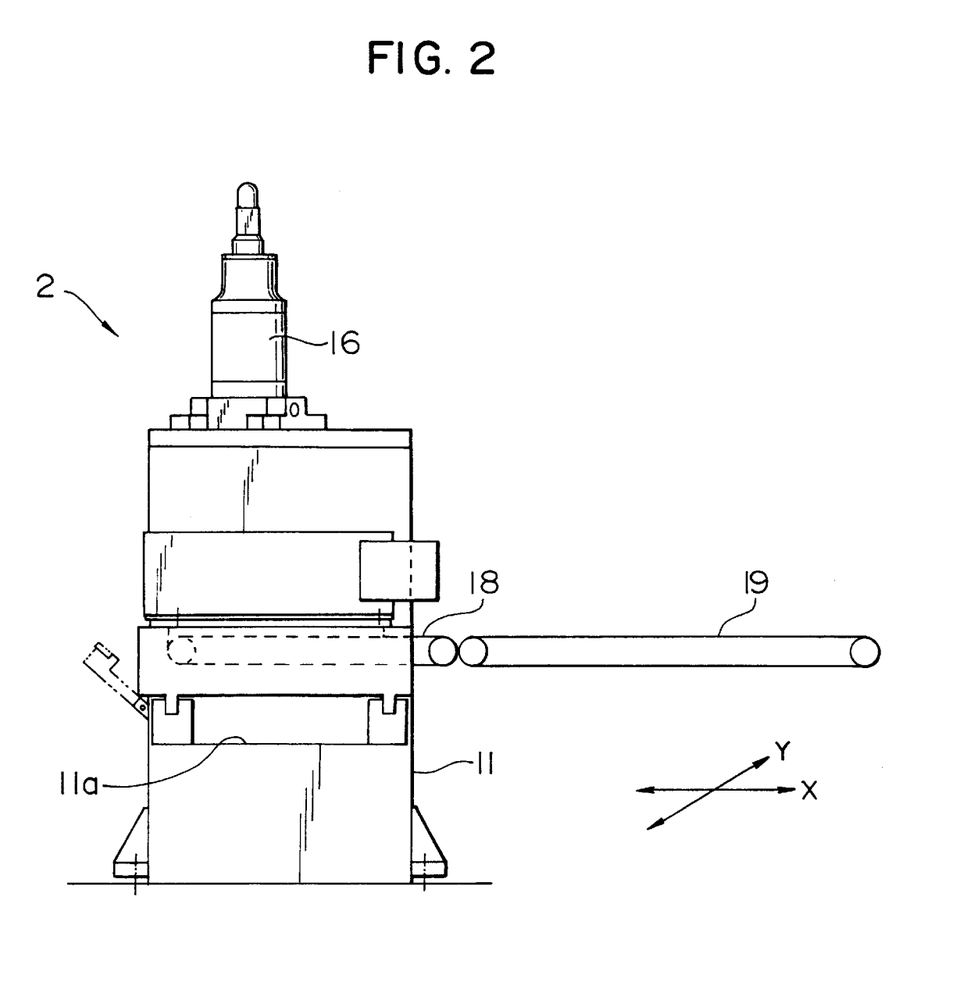
FIG. 2 is a front view of the work cutting apparatus of FIG. 1.
Figure 3:
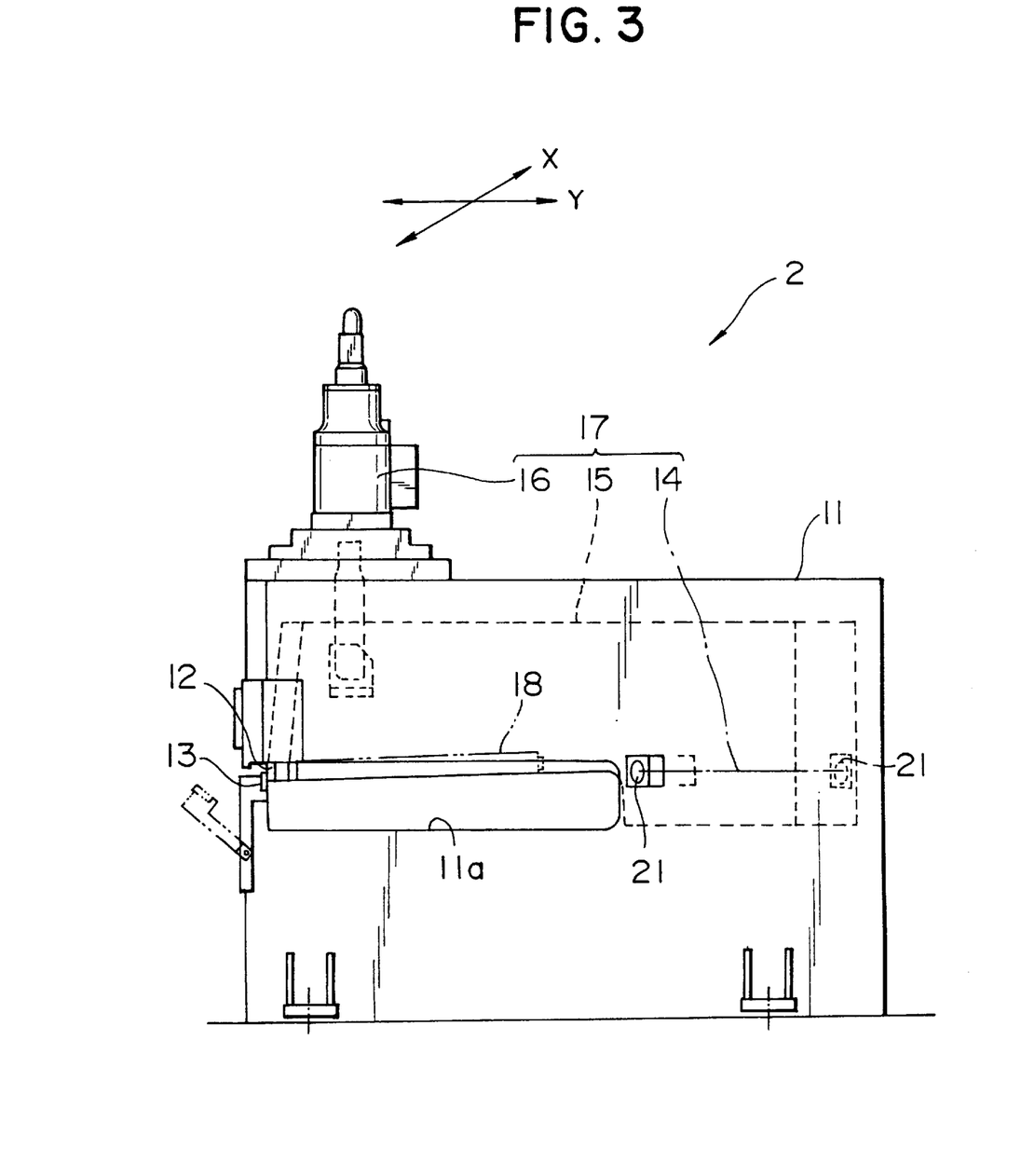
FIG. 3 is a right side view of the work cutting apparatus of FIG. 1.
Figure 4:
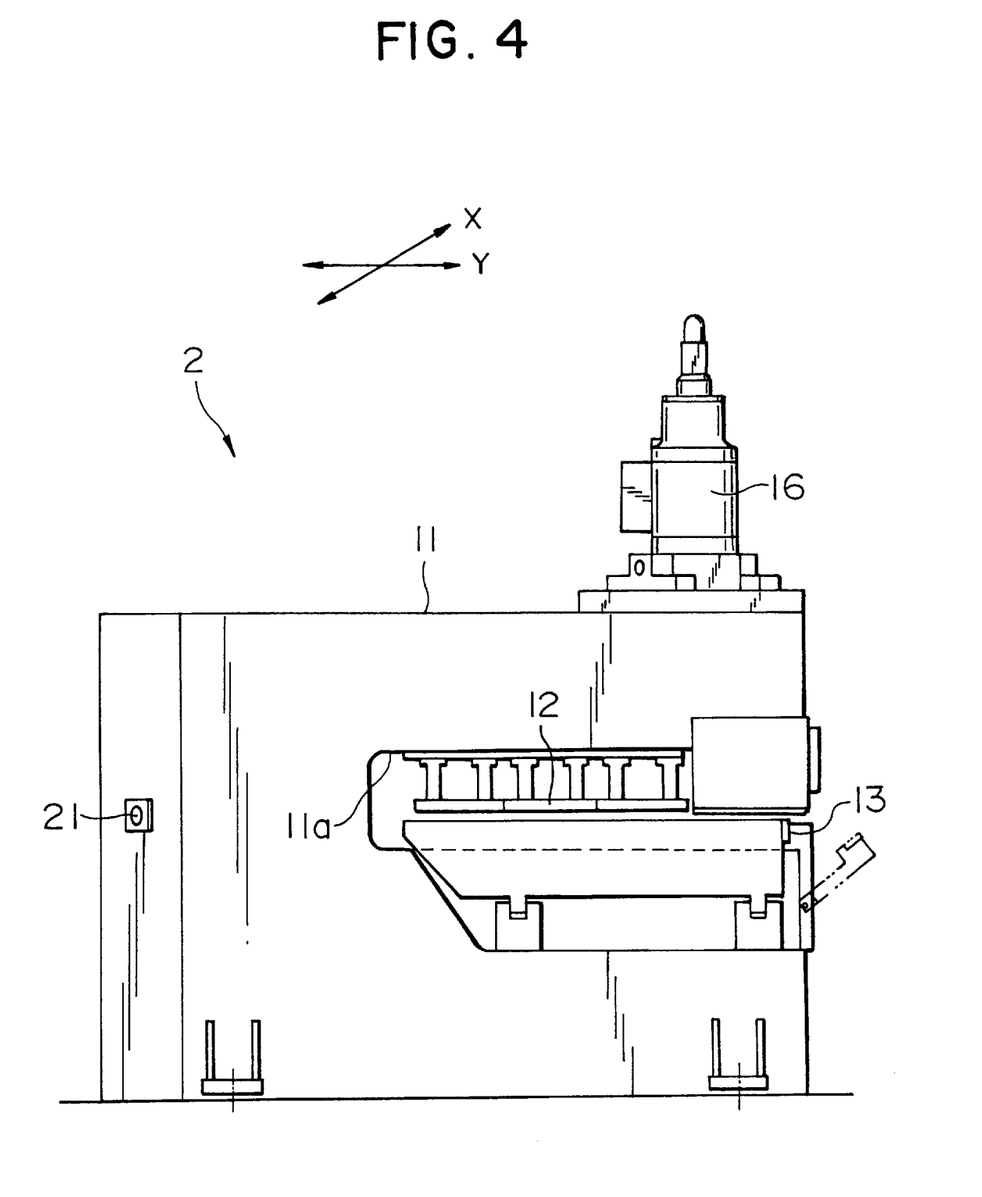
FIG. 4 is a left side view of the work cutting apparatus of FIG. 1.

The movable blade 12 is mounted on the lower part of the tip of a ram 15 supported so as to be able to freely pivot vertically via the pivot support shaft 14 on the rear part of the frame 11. A drive device 16 that vertically moves the arm 15 is arranged on the front upper surface of the frame 11 and this drive system 16, arm 15, pivot support shaft 14, and the like, forms a movable blade drive system 17 that pivots the movable blade 12 vertically. Due to the vertical movement provided by the driving of the drive system 17, the movable blade 12 engages with the fixed blade 13 and a cutting process is performed by the shearing of the work W.

Furthermore, a conveyor 18 that ejects the cut sample cut from the work W by the movable blade 12 and fixed blade 13, in the transport direction A parallel with the X-axis direction, is arranged on the inside of the frame 11. A secondary conveyor 19 that further moves the cut samples which have transported by the conveyor 18 is positioned on the next level of the conveyor 18.

Figure 7:
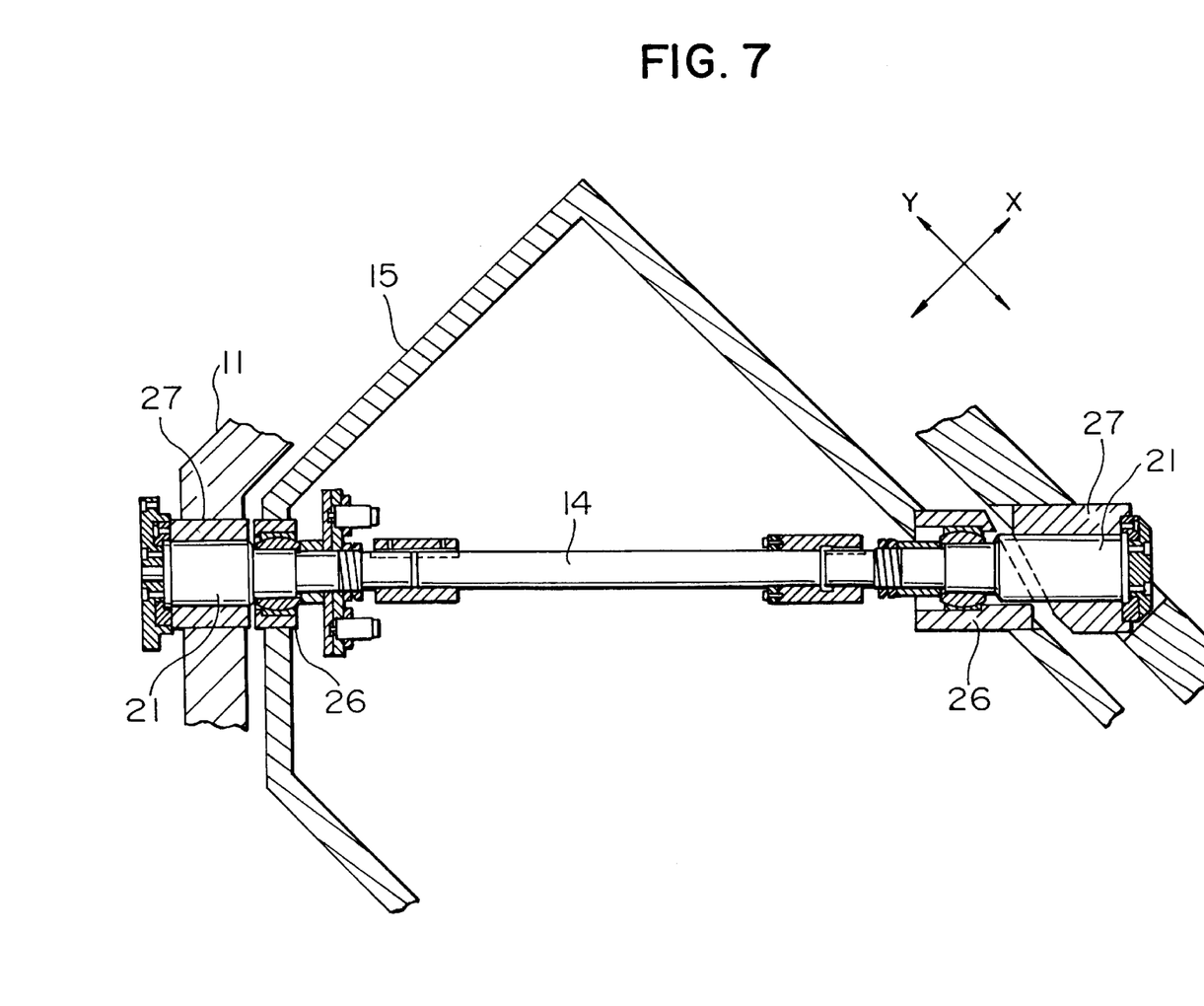
FIG. 7 is an enlarged horizontal sectional view showing the arrangement of the rotating support shaft on the work cutting apparatus of FIG. 1.

As shown in FIGS. 1 and 7, the pivot support shaft 14 is set so that the axial direction is angled with respect to both sides of the L-shaped fixed blade 13, for example, in a direction angled 45° with respect to both the X-axis and Y-axis. The arm 15 is supported with respect to this pivot support shaft 14 so as to be able to freely pivot via bearings 26 at both sides. A spherical bearing is used on the bearings 26.

Figure 8A:
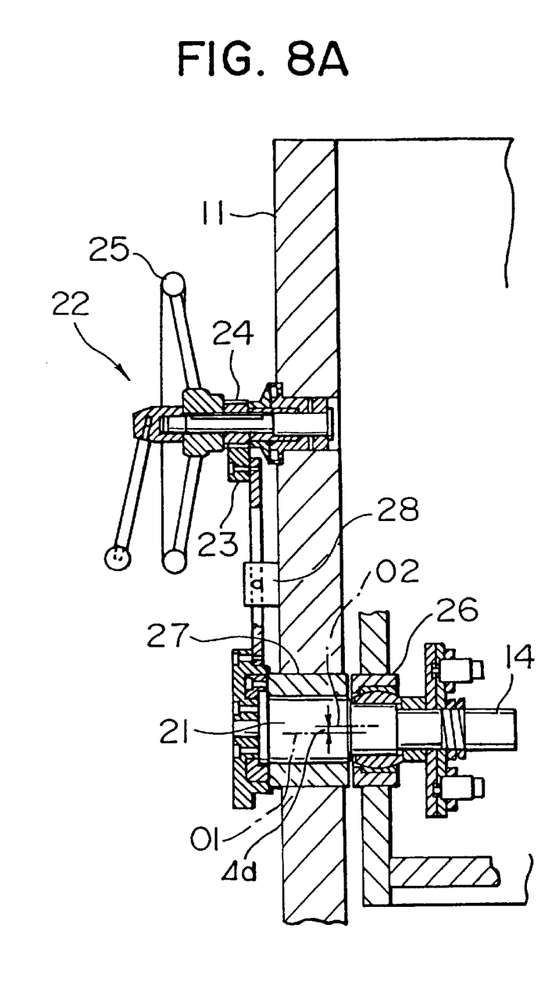
FIG. 8A is a vertical sectional view showing the movable blade adjustment means on the work cutting apparatus of FIG. 1.

Furthermore, as shown in the vertical section of FIG. 8A, the pivot support shaft 14 is arranged off-center and integral with the rotation shaft 21 support via a seat 27 on the frame 11. Specifically, when the rotation shaft 21 is in the standard rotation position, the shaft center 02 of the pivot support shaft 14 is slightly off-enter upwards by the amount Δd with respect to the shaft center 01 of the rotation shaft 21.

Furthermore, when the rotation shaft 21 is in the standard rotation position, the clearance of the horizontal direction of the movable blade 12 with respect to the fixed blade 13 is set to be the optimum for cutting the work W of a predetermined thickness.

A manual type movable blade adjustment means 22 is linked to the rotation shaft 21. The movable blade adjustment means 22 is a means for adjusting the horizontal position of the movable blade 12 with respect to the fixed blade 13 by minute changes to the front and rear of the shaft center of the pivot support shaft 14 by rotating the rotation shaft 21.

Figure 8B:
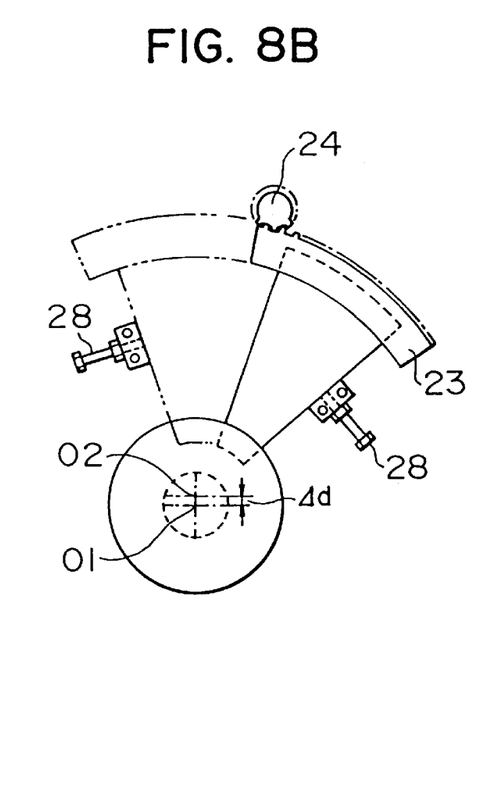
FIG. 8B is a side view showing the main part of the movable blade adjustment means and FIG. 8C is an explanatory drawing of the adjustment operations.

This movable blade adjustment means 22 comprises a sector gear 23 fixed to the end of the rotation shaft 21 and an adjustment handle 25 having a pinion 24 on the shaft part that engages with this sector gear 23. The adjustment handle 25 is mounted on the frame 11 so as to be freely rotatable. When the adjustment handle 25 is rotated, the rotation shaft 21 rotates in a direction opposite the direction of rotation of the adjustment handle 25 by an amount equivalent to the amount the adjustment handle 25 is rotated and the position of the pivot support shaft 14 is adjusted to the front or to the rear. Due to this, the clearance of the movable blade 12 with respect to the fixed blade 13 is adjusted corresponding to the thickness of the work W to be cut.

As the pivot support shaft 14 is positioned at an angle 45° with respect to both sides of the fixed blade 13, adjustment for both the side following the X-axis direction of the movable blade 12 and Y-axis direction may be simultaneously performed by the aforementioned single adjustment.

Furthermore, there is no need to arrange the movable blade adjustment means 22 for each side and one is sufficient and has a simple arrangement.

It should be noted that the adjustment amount by the movable blade adjustment means 22 is limited by a pair of stoppers 28 which contact the sector gear 23 arranged on the frame 11.

Figure 8C:
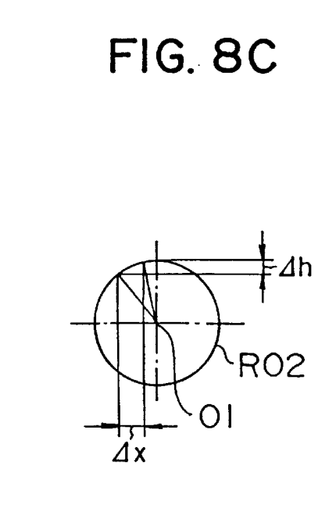

FIG. 8C shows the rotation path R02 of the shaft center 02 of the pivot support shaft 14 with respect to the shaft center 01 of the rotation shaft 21 in association with the movable blade adjustment. As shown clearly in the drawing, as a result of movable blade adjustment, the position of the pivot support shaft 14 changes not only towards the front and rear but also vertically but, as previously described, when the rotation shaft 21 is in the standard rotation position, as the shaft center 02 of the pivot support shaft 14 is slightly off-center upwards from the shaft center 01 of the rotation shaft 21, the vertical positional change amount Δh is extremely small compared to the positional change Δx to the front and rear of the pivot support shaft 14 by the adjustment and considering the size of the ram 15, the vertical positional change may be ignored.

Furthermore, the larger the distance between the pivot support shaft 14 and movable blade 12, the more insignificant this vertical positional change.

FIG. 9 shows a process drawing of the cutting operations by the work cutting apparatus 2. In this drawing, 12a indicates a section of the side following the Y-axis direction of the movable blade 12, 12b indicates a section of the side following the X-axis direction and 02 shows the rotation pivot of the movable blade 12.

Figure 9A:
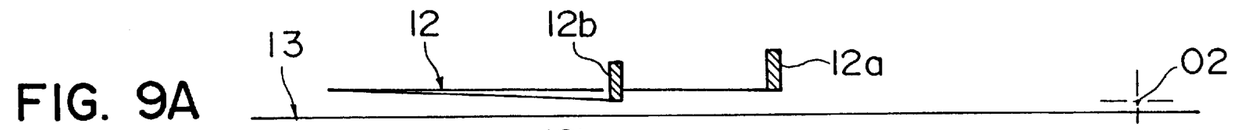
FIG. 9 is an explanatory drawing showing the cutting operations of the work cutting apparatus of FIG. 1.
Figure 9B:
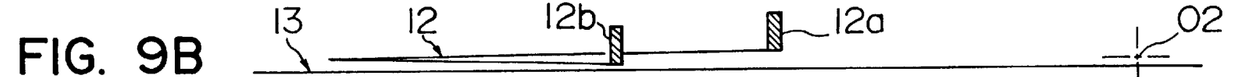

When the ram 15 descends from the state (FIG. 9A) where the drive device 16 of the movable blade drive system 17 is at top dead center and the ram 15 is in the upper standby position, to the position of FIG. 9B, one part of the movable blade 12 contacts the work W and cutting starts.

Figure 9C:
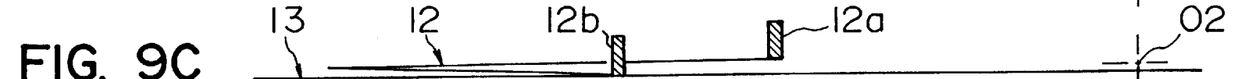
Figure 9D:
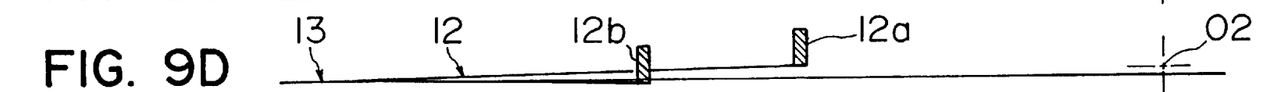
Figure 9E:
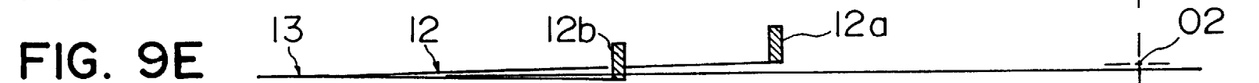
Figure 9F:
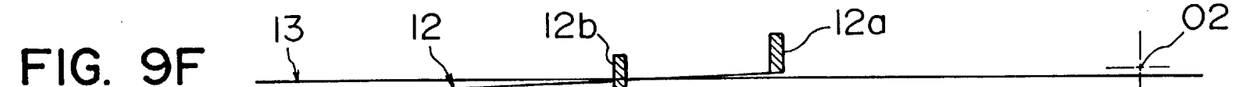

When the movable blade 12 descends from the position at FIG. 9C, the engagement between the movable blade 12 and fixed blade 13 starts. Once the over-cutting position of FIG. 9D has been passed, the angled part of the movable blade 12 and angled part of the fixed blade 13 engage (FIG. 9E).

Figure 9G:
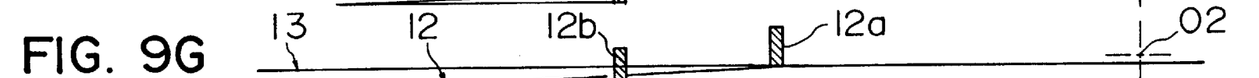
Figure 9H:
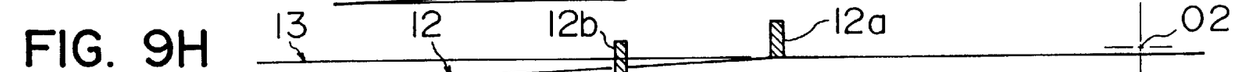
Figure 9I:
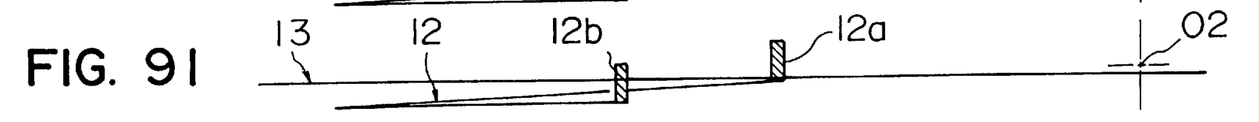

Furthermore, once the ram 15 has passed the position (FIG. 9F) being the process standard attitude and descends to the position of FIG. 9G, the movable blade 12 and fixed blade 13 finish engaging and cutting is finished. The ram 15 continues to descend (FIG. 9H) until the drive device of the movable blade drive system 17 reaches the bottom dead center as shown in FIG. 9I. The upwards movement of the movable blade 12 is performed by the reverse operations of the aforementioned downwards movement and returns to the original stand-by position.

The work cutting apparatus of the present invention is a work cutting apparatus provided with a fixed blade of which the plan shape is approximately L-shaped and a movable blade which moves vertically having an approximately L-shape aligned with that of the fixed blade and which cuts work by the engagement of the fixed blade and movable blade, provided with a movable blade adjustment means that adjusts the horizontal position of the movable blade with respect to the fixed blade and, by a single adjustment operation, this movable blade adjustment means simultaneously adjusts both sides forming the L-shape of the movable blade. Thus, the adjustment operation may be performed by a single operation and the operation is simple without the need for a plurality of systems for clearance adjustment of the movable blade.

With this arrangement, the movable blade is mounted on the tip of an arm that vertically moves via a pivot support shaft arranged on the frame and when the axial direction of the pivot support shaft is angled with respect to both sides forming the approximate L-shape of the fixed blade, a plurality of guide systems for vertical movement of the movable blade are unnecessary. The adjustment system is simple and the clearance of both sides of the movable blade forming the L-shape are adjusted by a single adjustment of the single pivot support shaft.

Furthermore, in this arrangement, when the rotating support shaft is biased, the clearance adjustment of the movable blade with respect to the fixed blade may be performed by rotation of the rotating support shaft and the movable blade adjustment means requires only a simple arrangement.

We claim:

1. A work cutting apparatus, comprising:
   a frame defining a generally rectangular bed;
   a fixed blade including a pair of intersecting blade segments defining an L-shape disposed in one corner of said bed, said blade segments having cutting edges lying in a substantially horizontal plane;
   an arm mounted for pivotal movement in said bed and carrying at one end a movable blade formed by intersecting blade segments defining an L-shape cooperable with said fixed blade for cutting work;
   a pivot shaft having its ends mounted in said frame and supporting an end of said arm opposite said one end for pivotal movement; and
   means for positionally adjusting in a horizontal direction said movable blade with respect to said fixed blade including:
   said pivot shaft being disposed with its axis inclined with respect to said arm to position one end of said pivot shaft horizontally closer to said movable blade than said other end, whereby substantially horizontal displacement of said pivot shaft toward and away from said fixed blade includes a simultaneous corresponding movement of both segments of said movable blade with respect to the cooperating segments of said fixed blade; and
   means for substantially horizontally displacing said pivot shaft toward and away from said fixed blade.

2. The work cutting apparatus according to claim 1 in which said arm is formed of a generally rectangular body and carries said segments of said movable blade on sides intersecting at one corner of said body, and said pivot shaft is substantially horizontally inclinedly disposed with respect to sides of said body intersecting at a diagonally opposite corner thereof.

3. The work cutting apparatus according to either one of claim 1 or claim 2 wherein said pivot shaft has its ends mounted in said frame for eccentric movement with respect to said pivot shaft axis, and means for rotating said ends of said pivot shaft to eccentrically displace said pivot shaft and simultaneously displace said segments of said movable blade with respect to those of said fixed blade.

* * * * *